S. R. Bartlett,
Band Pulley.
No. 106,454.	Patented Aug. 16, 1870.
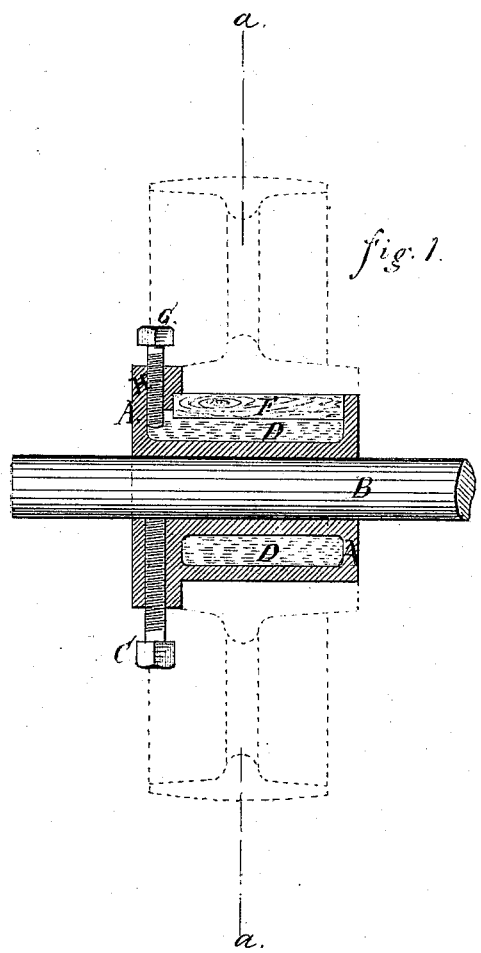
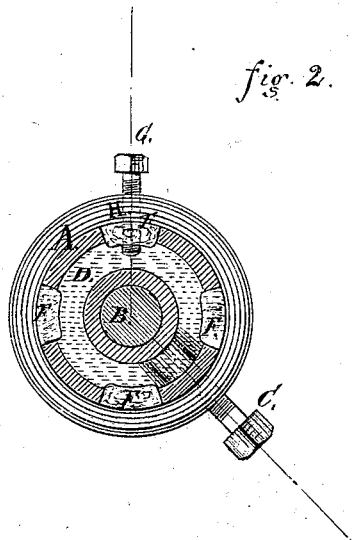
Witnesses:	Inventor:

United States Patent Office.

SAMUEL R. BARTLETT, OF CHICAGO, ILLINOIS.

Letters Patent No. 106,454, dated August 16, 1870.

IMPROVED AUTOMATIC LUBRICATING-SLEEVE.

The Schedule referred to in these Letters Patent and making part of the same.

*To whom it may concern:*

Be it known that I, SAMUEL R. BARTLETT, of the city of Chicago, in the county of Cook and State of Illinois, have invented a new and useful Improvement in Automatic Lubricating-Sleeves; and I do declare that the following is a true and accurate description thereof, reference being had to the accompanying drawing and to the letters of reference marked thereon and being a part of this specification.

Figure 1 is a section view of my invention.

Figure 2 is a cross-section of my invention on the line *a a*.

Like letters refer to like parts in each figure.

This invention relates to an improvement in self-oiling bearings, and consists in the construction of a sleeve, which is fixed fast to the shaft by a set-screw or other means, and made hollow to contain the oil or other lubricating material used, and provided with slots or apertures through its outside shell, which are filled with wood, cotton-waste, or other suitable conducting material, through which the lubricating matter passes to the outer surface of the sleeve.

Upon this sleeve, so kept self-lubricated, the bearings, especially that loose pulleys, revolve instead of upon the shaft, as usual.

In the drawing—

A is a hollow sleeve, fixed fast to the shaft B by the set-screw C.

D represents the hollow part of the sleeve, filled with lubricating material, and F, the slots, filled with wood or other conductor, through which the lubricating material passes to the outer surface of the sleeve.

H is an orifice, through which the lubricating material is poured into the hollow part of the sleeve, closed air-tight by the screw or plug G.

The advantages of this invention are, that the bearing is kept constantly lubricated, without waste of the material used for that purpose, thus avoiding the danger of becoming dry and cutting.

The bearing can be repaired more easily and economically, as the shaft escapes wear entirely, it coming on the sleeve, which can be removed when it becomes necessary, and a new one fitted to a larger hole in same pulley.

The shaft remains always in balance, being unworn by the pulley, and the lubricating matter carried near the center.

What I claim as my invention, and desire to secure by Letters Patent, is—

The cylindrical sleeve A, secured to the shaft B by a thumb-screw, C, and provided with a space, D, with apertures F, with an orifice, H, provided with screw G, when each of said parts is constructed as described, and all are combined to operate as and for the purposes set forth.

SAM. R. BARTLETT.

Witnesses:
GEO. O. MANCHESTER,
SAML. B. BELL.